(12) United States Patent
Carbone et al.

(10) Patent No.: US 7,302,483 B1
(45) Date of Patent: Nov. 27, 2007

(54) JOB ANALYSIS AND WORKFLOW APPLICATION

(75) Inventors: William L. Carbone, Loganville, GA (US); Joyce C. Cauley, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 699 days.

(21) Appl. No.: 10/256,150

(22) Filed: Sep. 27, 2002

(51) Int. Cl.
*G60F 15/173* (2006.01)
*G60F 15/06* (2006.01)

(52) U.S. Cl. .................. 709/225; 709/223; 709/227

(58) Field of Classification Search ........... 709/203, 709/214, 216, 217, 223, 225, 227; 707/1, 707/8, 10
See application file for complete search history.

(56) References Cited

U.S. PATENT DOCUMENTS

| | | | | |
|---|---|---|---|---|
| 5,321,605 | A * | 6/1994 | Chapman et al. | 705/7 |
| 5,418,949 | A * | 5/1995 | Suzuki | 707/205 |
| 5,774,661 | A * | 6/1998 | Chatterjee et al. | 709/203 |
| 5,787,437 | A * | 7/1998 | Potterveld et al. | 707/103 R |
| 5,920,867 | A * | 7/1999 | Van Huben et al. | 707/101 |
| 5,978,408 | A * | 11/1999 | Thornton | 372/96 |
| 6,021,410 | A * | 2/2000 | Choy | 707/103 R |
| 6,327,594 | B1 * | 12/2001 | Van Huben et al. | 707/200 |
| 6,356,915 | B1 * | 3/2002 | Chtchetkine et al. | 707/200 |
| 6,363,400 | B1 * | 3/2002 | Chtchetkine et al. | 707/200 |
| 6,405,215 | B1 * | 6/2002 | Yaung | 707/104.1 |
| 6,778,978 | B1 * | 8/2004 | Lee | 707/3 |
| 6,801,818 | B2 * | 10/2004 | Kopcha | 700/97 |
| 6,947,903 | B1 * | 9/2005 | Perry | 705/28 |
| 7,096,222 | B2 * | 8/2006 | Kern et al. | 707/100 |
| 7,100,147 | B2 * | 8/2006 | Miller et al. | 717/102 |

OTHER PUBLICATIONS

Freesoft.org. Connected: An internet Encyclopedia, Operation [WWW document]. URL http://www.freesoft.org/CIE/Course/Section 3/2.htm, Accessed Dec. 3, 2002.
Freesoft.org. Connected: An internet Encyclopedia, IP Protocol Overview [WWW document]. URL http://www.freesoft.org/CIE/Course/Section 3/3.htm, Accessed Dec. 3, 2002.
Freesoft.org. Connected: An internet Encyclopedia, Datagrams and Streams [WWW document]. URL http://www.freesoft.org/CIE/Course/Section 3/5.htm, Accessed Dec. 3, 2002.

(Continued)

*Primary Examiner*—Ario Etienne
*Assistant Examiner*—Sargon N. Nano
(74) *Attorney, Agent, or Firm*—Withers & Keys, LLC

(57) ABSTRACT

A system and method for interacting with a workflow system is disclosed. The system can provide a first party access to a virtual folder by placing the virtual folder into a first virtual workbasket and the system can provide access to a the virtual folder to a second party. The system can also provide access to the virtual folder to a third party, that has different rights to view and/or modify the virtual folder. In some cases, the third party can interact with the virtual folder regardless of where the virtual folder is located. The workflow system also includes provisions that permit the tracking, troubleshooting and management of virtual folders and/or related jobs.

8 Claims, 3 Drawing Sheets

OTHER PUBLICATIONS

Freesoft.org. Connected: An internet Encyclopedia, Model of Operation [WWW document]. URL http://www.freesoft.org/CIE/Course/Section 3/6.htm, Accessed Dec. 3, 2002.

Freesoft.org. Connected: An internet Encyclopedia, IP Packet Structure [WWW document]. URL http://www.freesoft.org/CIE/Course/Section 3/7.htm, Accessed Dec. 3, 2002.

Freesoft.org. Connected: An internet Encyclopedia, RFC Examples [WWW document]. URL http://www.freesoft.org/CIE/Course/Section 3/9.htm, Accessed Dec. 3, 2002.

Hitachi, Ltd,; Intel Corporation Matsushita Electric Industrial, Co., Ltd.; Sony Corporation; Toshiba Corporation. "5C Digital Transmission Content Protection White Paper." Entire document (13 pages). Revision 1.0 Jul. 14, 1998.

Pearson, B. Digital Transmission Content Protection [Presentation]. Entire document (25 pages), Jun. 16, 1999.

* cited by examiner

JOB ANALYSIS AND WORKFLOW APPLICATION

BACKGROUND

1. Field of the Invention

The present invention relates to a system and method for tracking workflow.

2. Background of the Invention

In situations where a business receives multiple tasks or jobs, it becomes important to track and manage the various jobs. Without proper management oversight, jobs can be delayed, lost, or remain incomplete. In some cases, the parties that have been delegated those jobs, either through inattention or some other mistake, fail to complete jobs on time and under budget. These sorts of problems are costly to the business and can go undetected, causing additional problems.

Manual efforts to track jobs and tasks have been cumbersome and time consuming to use. In some cases, manual systems use routing slips. The goal is to properly route a paper file containing information, documents and other items related to a particular job, through various offices or personnel throughout a business.

After the first person on the routing slip performs their task, the file is then sent, usually via interoffice mail, to the second party on the list. After the second party completes his or her task, the file is then sent to the third party. This process continues until all of the parties have completed their tasks. One problem with this manual system is that only the party that is in current possession of the file knows where the file is located. Other parties, including management, do not know the location or status of the file.

There have been attempts to automate this manual routing process, but related systems have been difficult to use and have had very limited functionality. For example, related systems are not able to track, troubleshoot, or adequately manage the jobs and tasks related to a business.

SUMMARY OF THE INVENTION

The present invention is directed to a method for tracking workflow. The invention includes the steps of: providing a first party access to a virtual folder by placing the virtual folder into a first virtual workbasket. The virtual folder includes information related to a job and the first party can retrieve information from the virtual folder and add information to the virtual folder. The system also provides a second party access to the virtual folder by placing the virtual folder into a second virtual workbasket after receiving information from the first party that the first party has completed a first task.

The second party is capable of retrieving information from the virtual folder and adding information to the virtual folder after the second party has been given access to the virtual folder. Other parties can also retrieve information from the virtual folder while the virtual folder is in either the first virtual workbasket or the second virtual workbasket.

In another aspect of the invention, the other party is a manager.

In another aspect of the invention, the virtual folder is a data structure on a computer system.

In another aspect of the invention, the first virtual workbasket is a data structure associated with the first party.

In another aspect of the invention, the first party is located in a different geographical location than the second party.

In another aspect of the invention, the step of moving the virtual folder from the second virtual workbasket to a third virtual workbasket after receiving information related to a completion of a task by the second party.

In another aspect, the invention includes a system for tracking workflow. The system can include an application associated with at least one database, the application managing access to the database, where the application provides sequential access to the database to a first party and then a second party by permitting modification of information associated with a virtual folder by a first party while prohibiting modification of the information by a second party and then permitting modification of the information by the second party while prohibiting modification of the information by the first party, and where access to the information is provided at all times to a manager.

In another aspect of the invention, the system provides information to the manager by job type.

In another aspect of the invention, the system provides information to the manager by job status.

In another aspect of the invention, the system provides information to the manager by workbasket.

In another aspect of the invention, the system provides information to the manager by geographic location.

In another aspect of the invention, the system provides information to the manager by party.

In another aspect, the invention includes a method for tracking a job using a workflow system. This method can include the following steps. Providing a first party access to the workflow system, the first party being associated with a first virtual workbasket, providing a second party access to the workflow system, the second party being associated with a second virtual workbasket, a virtual folder configured to move from the first virtual workbasket to the second virtual workbasket, wherein the virtual folder includes information related to a job and wherein the first party can retrieve information from the virtual folder and add information to the virtual folder when the virtual folder is associated with the first virtual workbasket.

In another aspect of the invention, the second party can retrieve information from the virtual folder and add information to the virtual folder when the virtual folder is associated with the second virtual workbasket, and a third party is provided access to the workflow system wherein the access given to the third party is different than the access given to the first party or the second party.

In another aspect of the invention, the workflow system can provide tracking information related to the virtual folder to the third party.

In another aspect of the invention, the workflow system can provide troubleshooting information to the third party.

In another aspect of the invention, the workflow system can provide troubleshooting information related to the virtual folder to the third party.

In another aspect of the invention, the workflow system can provide information related to multiple virtual folders to the third party.

In another aspect of the invention, the workflow system can provide information related to multiple different jobs to the third party.

In another aspect of the invention, the workflow system can provide information related to a number of jobs associated with any party.

In another aspect of the invention, the workflow system can provide financial and/or cost information related to a job to the third party.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE PREFERRED EMBODIMENTS

Figure 1:
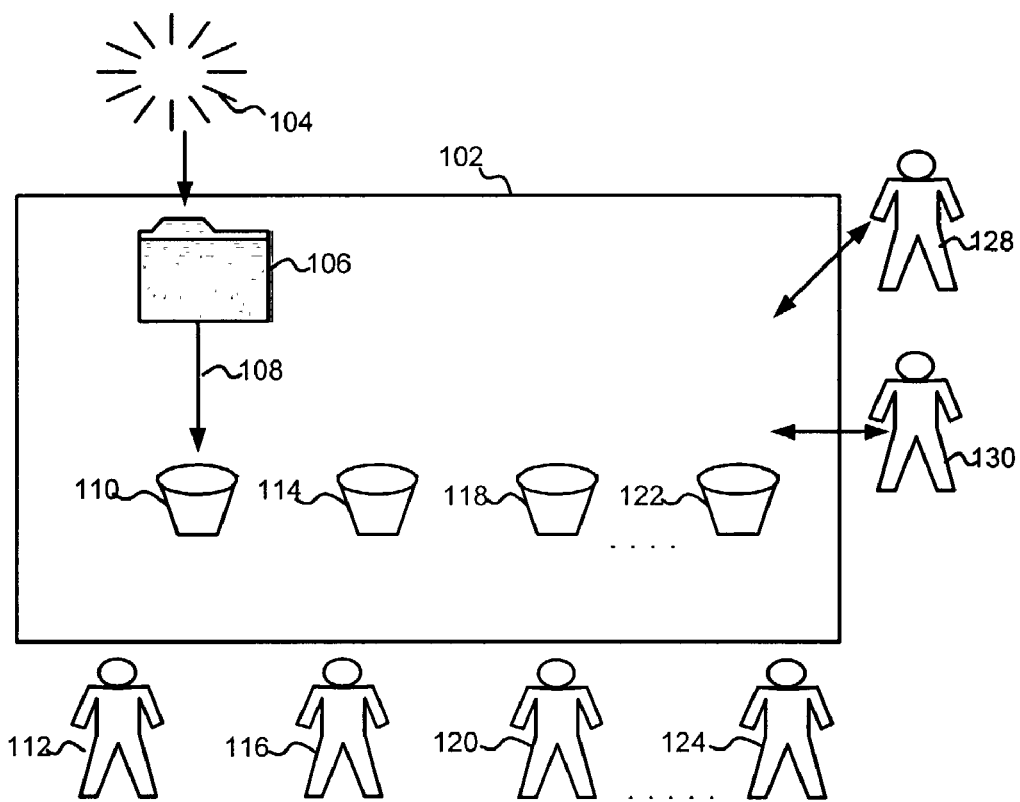
FIG. 1 is a schematic diagram of a preferred embodiment of a first condition of the present invention.

FIG. 1 is a schematic diagram of a preferred embodiment of a workflow system 102. In the embodiment shown in FIG. 1, the business would use workflow system 102 to assist with workflow tracking.

The process begins with an initiation 104. In some cases, initiation 104 is a demand or request made to a business to provide a certain good or service, or to perform some task. Initiation 104 could also be a task or request that is generated internally within the business.

When initiation 104 is received by workflow system 102, workflow system 102 creates a folder 106. Folder 106 can also be referred to as a virtual folder because folder 106 is not a physical folder but a virtual folder that exists as a data structure within workflow system 102. When folder 106 is created, it is given various initial characteristics and it is populated with some initial data. Folder 106 also preferably includes information related to the demand or request.

After folder 106 has been created, folder 106 is routed 108 to a first workbasket 110. First workbasket 110 is associated with a first party 112. A workbasket is a location, space, region, data structure or a portion of computer resources that are associated with a particular party. In some cases, workbaskets can be similar to in boxes of e-mail programs, in other cases, workbaskets can be directories or other allocated regions of a storage device. In still other cases, workbaskets can be indicia or markers that are associated with a particular party and particular data structures. In other words, workbaskets associate a party with particular data structures. In the embodiment shown in FIG. 1, the data structure is a folder 106.

First party 112 interacts with workflow system 102. Preferably, workflow system 102 includes security provisions and manages access. Appendix 1, which forms part of this specification, discloses an example of security provisions that can be used with various embodiments of the present invention.

In a preferred embodiment, when folder 106 is associated with first workbasket 110, system 102 prevents other parties 116, 120 and 124 from modifying or deleting folder 106, but permits first party 112 to modify information associated with folder 106. While first party has folder 106, other parties may be able to access and retrieve information from folder 106, but those other parties would not be able to modify or change the contents of folder 106 until folder 106 is in their workbasket.

Preferably, workflow system 102 provides access to managers 128 and 130. managers 128 and 130 are able to view much of the information retained in workflow system 102. For example, managers 120 and 130 could view all of the folders, all of the workbaskets, and sort and/or search the information in various different ways.

In some embodiments, there is more than one level of access granted to mangers 128 and 130. For example, in some embodiments, manager 128 would be given different rights than manager 130. For example, manager 128 may be given the right to delete folders while manager 130 would not have that right. In the same example, manager 130 may be given the right to move a folder from one workbasket to another, while manager 128 would not be permitted to do so.

In some embodiments of the invention, one, several or all of the following commands or actions are available The name of the action is in all capitals a description of the action follows the name.

AUTO_FORWARD_ITEM: Forward a completed item to the next step automatically without prompting.

FORWARD: Forward a workflow item to next step in a pre-defined workflow.

LAUNCH: Launch the operation associated with a step in a workflow.

PRINT: Print an item; simple or group from the JMS desktop.

REMOVE: Remove an object (simple or group) from a workbasket.

REROUTE: Reroute a workflow item to workbasket.

RETRIEVE: Retrieve a non-tracked item into a workbasket.

RETURN_TO_CREATOR: Return item to creator.

RETURN_TO_OWNER: Return item to assigned Designer.

ROUTE: Route an item to a workbasket or pre-defined workflow.

SCAN: Scan items into the system.

SHOW_ALL_ITEMS: Show all items in a workbasket.

SHOW_WORKITEMS_ONLY: Show only the items in a workbasket that are work items.

SUSPEND: Suspend a workflow item from any further workflow operation.

TERMREROUTE: Send a rerouted item back to original path.

TERMWORKFLOW: Terminate all workflow operations for a workflow item, and remove the item from the desktop.

UNSUSPEND: Unsuspend previously suspended item.

VIEW: View an item; simple or group. Preferably uses proper corresponding editor.

After first party 112 has completed his assigned task, first party 112 interacts with folder 106 and indicates completion of the task 106 in folder 106. After folder 106 has been modified to include information that first party 112 has completed his respective task, folder 106 is then routed to the next appropriate workbasket.

There are many different ways the next appropriate workbasket can be selected. In some cases, the routing instructions for folder 106 are created when folder 106 is created. In other cases, routing instructions are provided by a party or a manager. In other cases, the current party provides the routing instructions for the next party or the next several parties. In some other cases, routing instructions are automatically created. Preferably, one or more pre-defined workflows are established. In some embodiments, users have the ability to ad-hoc route an authorization to any workbasket. In some embodiments, users are not permitted to create new workflows on the fly.

Figure 2:
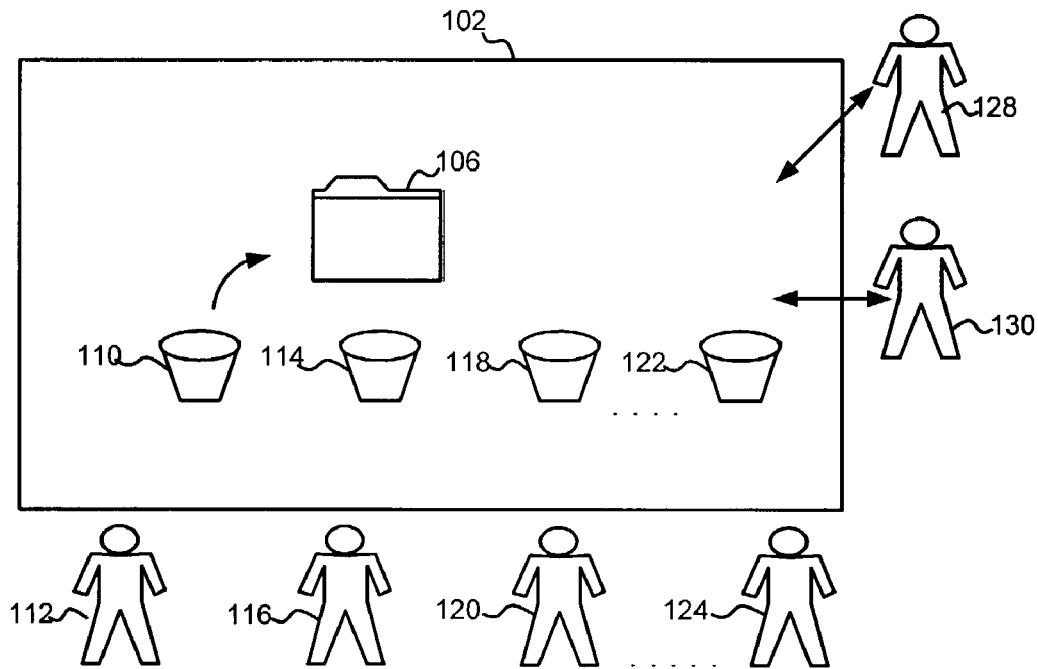
FIG. 2 is a schematic diagram of a preferred embodiment of a second condition of the present invention.

Regardless of exactly how the routing instructions are provided, in the embodiment shown in FIG. 2, folder 106 is routed to a second workbasket 114 associated with a second party 116. After folder 106 has been routed to second workbasket 114, workflow system 102 preferably changes the rights and access conditions associated with folder 106. Because folder 106 is now in second workbasket 114, second party 116 is able to access and modify information contained in folder 106. Other parties, including first party 112, while (in some embodiments) able to view the contents of folder 106, are generally not permitted to modify information contained in folder 106.

Since first party 112 has completed his respective task, folder 106 is in a condition where it is appropriate for second party 116 to interact with the contents of folder 106. After second party 116 has completed her task, she indicates her completion in folder 106. After receiving information that second party 116 has completed her task, system 102 then routes folder 106 to a third workbasket 118.

After folder 106 is placed in third workbasket 118, third party 120 interacts with the contents of folder 106 until third party 120 completes his task. After completing his task, folder 106 is then routed to the next party. This process continues, and the process can include any desired number of parties and/or tasks. To show this generalized number of parties and tasks, FIGS. 1 and 2 include an nth workbasket 122 and an associated nth party 124.

Principles and features of an embodiment of the present invention can be understood in the context of an example. FIGS. 1 and 2 can be used in conjunction with this example. Consider an example where a new housing sub-division is being constructed, and a business entity is assigned the task of providing the telecommunications infrastructure to the sub-division. Assuming the business uses workflow system 102 to assist with the task of providing telecommunications infrastructure, the following steps could be implemented.

The process would begin with the assignment or request for the overall task, namely, the creation of a telecommunications infrastructure for a sub-division. In some cases, a user or manager initially populates and modifies folder 106 and assigns various tasks. In other cases, folder 106 is automatically created and populated according to pre-selected routines and algorithms.

Once folder 106 is complete, folder 106 is sent to first workbasket 110. First party 112 interacts with folder 106. In this example, folder 106 includes a site map for the sub-division and a description of the general telecommunication needs of the sub-division. In this example, first party 112 is a designer capable of designing a telecommunications infrastructure system to meet those needs.

First party 112 retrieves information from folder 106 and uses appropriate tools and applications to assist with the design task. In some embodiments, those tools and applications can also reside in workflow system 102. In other words, workflow system 102 houses related applications that assist various parties in fulfilling their respective tasks. First party 112 can modify information contained in folder 106 and place work product in folder 106. Thus, in this example, the design work performed by first party 112 in creating a design of the requisite telecommunications infrastructure for the sub-development can be uploaded or placed in folder 106. After first party 112 finishes designing an infrastructure system for the sub-division, first party 112 indicates to workflow system 102 that he has completed his respective task. As discussed above, workflow system 102 then routes folder 106 to second workbasket 114.

Second party 116 associated with second 114 is now able to interact with and modify information contained in folder 106. In the present example, second party 116 is a supervisor and second party 116 reviews the work of first party 112 and provides approvals to the work done by first party 112. After second party 116 has approved the design provided by first party 112, second party can provide or upload these approvals to folder 106. Second party then indicates completion of her task to workflow system 102.

After receiving information that second party 116 has completed her task, workflow system 102 then forwards the folder to third workbasket 118. In the present example, third party 120 is responsible for analyzing the approved design, breaking down the approved design into constituent components, and ordering those components from various suppliers. For example, the telecommunications infrastructure for the sub-division may require a certain length of cable, a certain number of telephone poles, a certain number of wire connectors, a certain number of switches, and other components. After third party 120 has created a parts list of the necessary components, third party 120 begins ordering those components from suppliers.

The parts list can be uploaded or associated with folder 106 as well as a contact list of suppliers for the various parts. If third party 120 is only responsible for ordering the parts, third party 120 would be finished with his task when all of the orders have been placed. If third party 120 is responsible for insuring the delivery of those parts to the sub-division, then third party 120 would not be able to indicate a completed task until those parts arrive safely at the sub-division. All of the information related to the task assigned to the third party 120 can be uploaded or associated with folder 106.

Assuming third party 120 completes his task, third party 120 would then indicate completion of the task to workflow system 102. After the task is completed, workflow system 102 would then forward folder 106 to the next workbasket. Other tasks that can be either assigned to various parties or performed by various parties include: creating unique job folders; accessing external applications to create files using a variety of applications, including word processing applications, graphics or CAD applications, and spreadsheet applications; automate routing and approval of the folders; intelligent distribution of folders to downstream organizations; store folders electronically; reassign workbaskets; manage drawings to prevent accidental loss; query, retrieve, and update information and/or files.

Eventually, the last or nth task is reached, and folder 106 is placed in the nth workbasket 122. Continuing with the present example, the nth task is the testing and verification task. This task is assigned to nth party 124. After nth party 124 completes her task, folder 106 then enters a post reconcile workflow process. Preferably, this post reconcile workflow process is used for every job that is created. This post reconcile workflow is used by the designer to reconcile and close the job once the actual construction on the job has been completed.

When the job has been completed, a construction clerk launches the job folder for updating the database with completion dates for the job. After the completion dates have been entered, the folder can then be placed in one or more locations. In some cases, the folders are sent to an "As Built" location and in other cases, the folders are sent to a final workbasket where either the folder itself or information form the folder can be posted to a continuing property records location.

Figure 3:
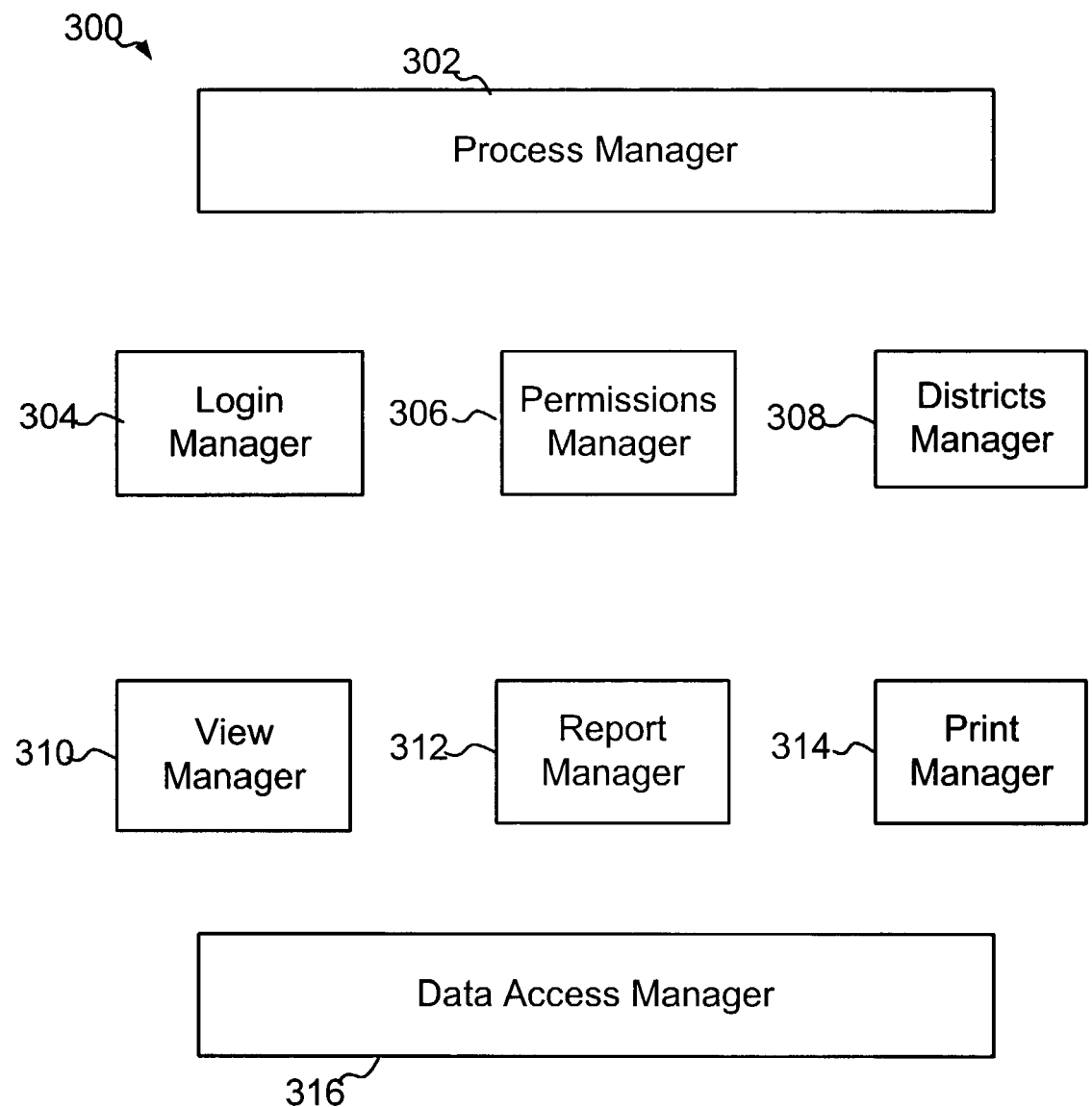
FIG. 3 is a schematic diagram of a preferred embodiment of application components in accordance with the present invention.

Although embodiments of the invention can be implemented on any suitable computer system, the architecture shown in FIG. 3 is preferred. As shown in FIG. 3, workflow system 102 (see FIG. 1) includes a Process Manager 302, a Login Manager 304, a Permissions Manager 306, a Districts Manager 308, a View Manager 310, a Report Manager 312, a Print Manager 314 and a Data Access Manager 316.

Process Manager 302 controls and monitors all of the various processes within workflow system 102 (see FIG. 1).

Login Manager 304 handles user logins. In some embodiments, Login Manager 304 communicates with other computer systems and retrieves login information from those other computer systems to assist in managing access.

Permissions Manager 306 determines the rights and permissions given to various users. Permissions Manager 306 preferably uses user ID's to determine what level of permission or rights a particular user has been given. In some respects, the Permissions Manager 306 is similar to a security hierarchy.

Districts Manager 308 handles configuration issues for multiple computer systems and/or different regions simultaneously. In one example, the way data is formatted and/or viewed may be different for different computer systems that communicate with workflow system 102. Districts Manager 308 manages these differences and ensures that data entered from one computer system will remain consistent and will be properly understood by workflow system 102, and likewise, information accessed from workflow system 102 will be properly formatted and/or displayed when retrieved by another computer system.

View Manager 310 controls the viewing of various documents and data. View Manager 310 can also show various forms and can load those forms with data from objects.

Report Manager 312 allows users to create reports on the fly, save those requests if the same report is to run repeatedly. The saved reports automatically fill in all the fields to make that same request again later. The reports can also be set to automatically run at certain time intervals, for example, every day, every month, or any other desired time interval.

Print Manager 314 provides the ability to print any data that can be queried in the application. In some applications, print manager 314 is simple and straight forward, in other embodiments, print manager 314 is complex and can utilize several different network or computer resources.

In some embodiments, a technical manager or a system administrator is responsible for configuring and maintaining the printers in a district. Print manager 314 provides a flexible method of selecting objects, for example, documents, plots, and other types of information, from a JMS desktop and delivers these objects to any network printer in a complete, collated package.

In some embodiments, Print Manager 314 runs on a UNIX Server. In some cases, there is only one Print Manager 314 in a district. Print Manager 314 preferably runs on the same server as workflow system 102. In some embodiments, however, Print Manager 314 runs on a separate UNIX server. This can be done to accommodate high volume districts. The location of Print Manager 314 can be assigned or defined through an administrator's tool kit.

There can be multiple Print Queues defined in a district, however it is preferred that the majority of printing go through a single Print Queue assigned to multiple dedicated Print Servers. This allows uninterrupted printing in the event of failure by a single Print Server. The Print Queue name can be created through an administrator's tool kit and the name can be associated with a printing Resource ID and Printer Name.

There are generally multiple Print Servers running in a district. Preferably, each Print Server has it's own unique name. The Print Server constantly polls the Print Queue to see if there are print jobs waiting in the queue. If a print job is waiting in the queue the Print Server retrieves the data and processes the job. The term "Print Server" can refer to both the workstation that run the Print Server process and the process itself.

Figure 4:
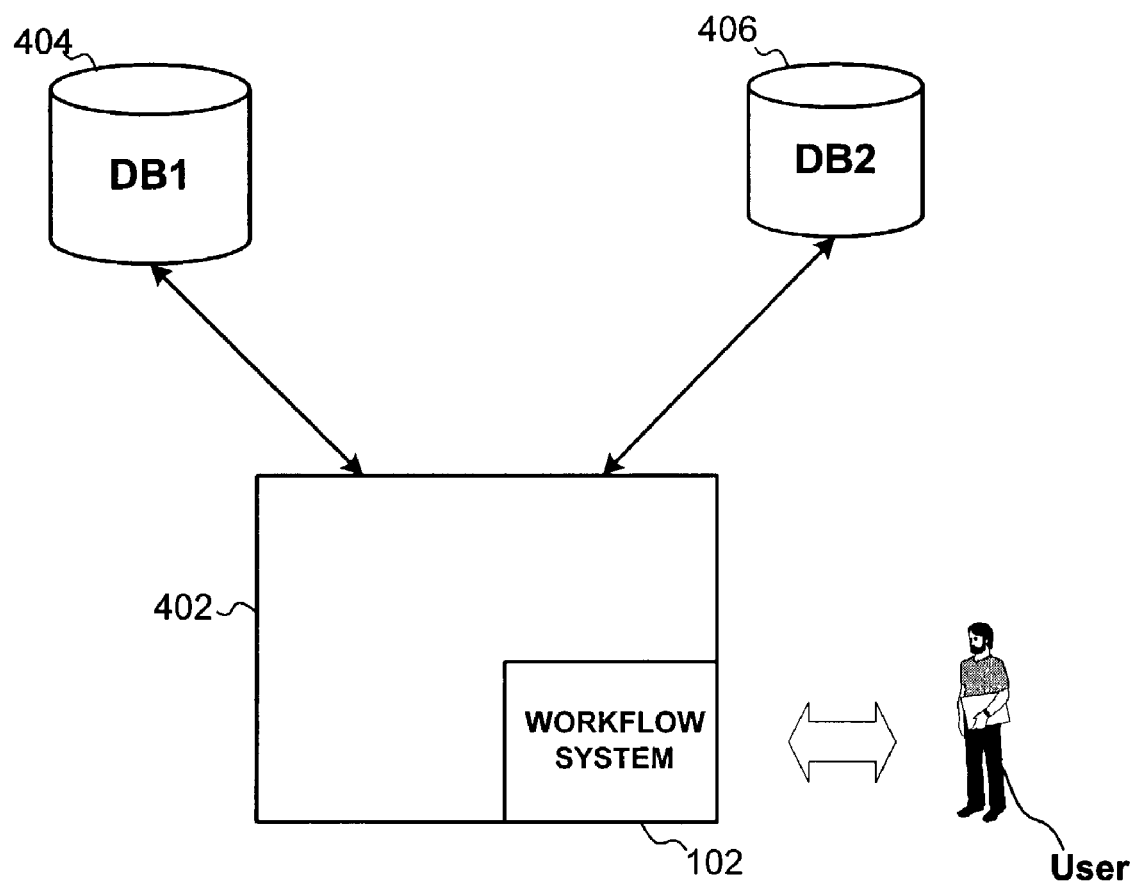
FIG. 4 is a schematic diagram of a preferred embodiment of the present invention.

Data Access Manager 316 assists in performing all of the data access functions required by any view or report As discussed above, in some embodiments, workflow system 102 is part of a suite of programs. FIG. 4 shows such an embodiment. Job Management System (JMS) 402 is in communication with a first database (DB1) 404 and a second database (DB2) 406. Obviously, JMS 402 can communicate with more databases and can also communicate with only a single database or no databases at all. JMS 402 preferably includes a variety of different programs and applications that assist users in performing various functions. For example, JMS 402 can include a scheduler program, a computer aided design (CAD) program, a computer aided manufacturing (CAM) program, a drafting program, a spreadsheet, a word processor, a database program, various computer languages, internet and web applications, networking applications, and any other relevant program or application. JMS 402 can be thought of as comprising a suite of programs. Preferably, workflow system 102 is part of the suite of JMS 402 programs.

With all of these various components in place, workflow system 102 is designed to be deployed to end users, for example, people on the field. Workflow system 102 allows end users to do several things, including diagnostics or troubleshooting of the underlying network application and retrieval of basic information about projects, tasks and work assignments. Some examples of projects, tasks and work assignments that end users can track or oversee include the number of jobs a particular designer or team of designers do in a given time period, the number or percentage of those jobs were estimates, the budget for those jobs, the capital expenditure dollars used in a given period of time (for example, one month), and other kinds of information. Any and all of the information in any database, including DB1 404 and DB2 406, can be accessed and analyzed by workflow system 102. Also, metrics data can be accessed and analyzed by workflow system 102.

For example, if a job included the installation of a piece of cable to a house and a designer, an example of an end user, decides to do that job, a job order is preferably prepared. The job order then goes through a work flow process. In some embodiments, the work flow process is automated. The steps can include sending the job to a supervisor for review, and then sending it to another party for review, then sending the job to a supervisor for signing. After the process is complete, the job can be sent to an appropriate party that is able to commence construction or installation of the piece of cable.

In some cases, a job might get lost, misplaced or unaccounted for in workflow system 102. Aspects of the present invention provide troubleshooting of those types of problems. For example, users can find information related to the location of the job and who is responsible for the job and who is associated with the job. Users can also find out what other users did with the job and other occurrences, events and/or states in the work flow process and who is responsible for those actions and occurrences.

Status information can also be retrieved and analyzed. Users can investigate who sent a particular job to whom, because, in some cases, users have the ability to send it to many different people at the same time. The present invention can be used to determine if all of the intended recipients received the job or not, including the date and time that a particular party received the job.

Workflow system 102 includes provisions for troubleshooting. For example, users can track any job. Users can also run a history report, and it provides information related to the job and the current status of the job. For example, the history report can provide information that the job has been deleted and the time of the deletion. In addition, history reports can also provide detailed information regarding a particular job. History reports can provide details of individual events associated with a particular job. These details include the date the event occurred, the workbasket associated with the event, a user associated with the event, and workflow information associated with the event. In some cases, history reports, also referred to as job history reports, can include hundreds of events associated with a particular job.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for tracking a job amongst a plurality of parties using a workflow system comprising the steps of:

providing a first party access to the workflow system, the first party being associated with a first virtual workbasket of the workflow system, wherein the access is unique to the first party and wherein at least a second party and a third party are prevented from gaining access to the items within the first virtual workbasket;

providing at least the second party access to the workflow system, the second party being associated with a second virtual workbasket of the workflow system, wherein the access is unique to the second party and wherein at least the first part and the third party are prevented from gaining access to the items within the second virtual workbasket;

creating a virtual folder configured to move from the first virtual workbasket to at least the second virtual workbasket, wherein the virtual folder includes information related to a job and contains routing instructions that specify which virtual workbasket to move the virtual folder to upon an indication of completion in a current virtual workbasket;

accessing by the workflow system the routing instructions of the virtual folder to move the virtual folder to the first virtual workbasket;

retrieving information by the first party from the virtual folder and adding information to the virtual folder when the virtual folder is within the first virtual workbasket;

receiving by the workflow system a first indication that the virtual folder access within the first virtual workbasket is complete;

in response to receiving the first indication accessing by the workflow system the routing instructions of the virtual folder to move the virtual folder to the second virtual workbasket;

retrieving information by the second party from the virtual folder and adding information to the virtual folder when the virtual folder is within the second virtual workbasket;

receiving by the workflow system a second indication that the virtual folder access within the second virtual workbasket is complete;

in response to receiving the second indication, accessing by the workflow system the routing instructions of the virtual folder to move the virtual folder to a third virtual workbasket; and providing to at least a third party access to the workflow system wherein the access given to at least the third party is to modify information in the virtual folder while the virtual folder is in the third virtual workbasket and is unique to the at least third party.

2. The method according to claim 1, wherein the workflow system can provide tracking information related to the virtual folder to the third party.

3. The method according to claim 1, wherein the workflow system can provide troubleshooting information to at least the third party.

4. The method according to claim 1, wherein the workflow system can provide troubleshooting information related to the virtual folder to at least the third party.

5. The method according to claim 1, wherein the workflow system can provide information related to multiple virtual folders to at least the third party.

6. The method according to claim 1, wherein the workflow system can provide information related to multiple different jobs to at least the third party.

7. The method according to claim 1, wherein the workflow system can provide information related to a number of jobs associated with any party.

8. The method according to claim 1, wherein the workflow system can provide financial and/or cost information related to a job to at least the third party.

* * * * *

UNITED STATES PATENT AND TRADEMARK OFFICE
CERTIFICATE OF CORRECTION

| | | |
|---|---|---|
| PATENT NO. | : 7,302,483 B1 | Page 1 of 1 |
| APPLICATION NO. | : 10/256150 | |
| DATED | : November 27, 2007 | |
| INVENTOR(S) | : William L. Carbone and Joyce C. Cauley | |

It is certified that error appears in the above-identified patent and that said Letters Patent is hereby corrected as shown below:

Col. 1, line 3, insert

-- RELATED APPLICATIONS
The present application claims priority to U.S. Provisional Application 60/381,324, filed on May 20, 2002, and entitled Job Analysis and Workflow Application. --

Signed and Sealed this

Seventh Day of April, 2009

JOHN DOLL
*Acting Director of the United States Patent and Trademark Office*